United States Patent
Ryu et al.

(10) Patent No.: US 9,313,719 B2
(45) Date of Patent: Apr. 12, 2016

(54) APPARATUS FOR PROVIDING INFORMATION ABOUT AVAILABLE SERVICE USING PROXY SERVER AND METHOD THEREFOR

(71) Applicant: Electronics and Telecommunications Research Institute, Daejeon (KR)

(72) Inventors: Cheol Ryu, Daejeon (KR); Hyung Seok Lee, Daejeon (KR); Jae Ho Lee, Daejeon (KR); Seok Jin Yoon, Daejeon (KR); Do Hyung Kim, Daejeon (KR); Jin Suk Ma, Daejeon (KR); Choong Bum Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/603,198

(22) Filed: Jan. 22, 2015

(65) Prior Publication Data
US 2015/0208325 A1    Jul. 23, 2015

(30) Foreign Application Priority Data
Jan. 22, 2014 (KR) .................. 10-2014-0007881
Jan. 22, 2015 (KR) .................. 10-2015-0010410

(51) Int. Cl.
*H04W 48/14* (2009.01)
*H04W 28/02* (2009.01)
*H04W 4/06* (2009.01)
*H04H 60/87* (2008.01)
*H04L 29/08* (2006.01)

(52) U.S. Cl.
CPC ........... *H04W 48/14* (2013.01); *H04L 67/2838* (2013.01); *H04W 4/06* (2013.01)

(58) Field of Classification Search
CPC ...... H04W 16/14; H04W 48/16; H04W 84/12
See application file for complete search history.

(56) References Cited

U.S. PATENT DOCUMENTS

| | | | | |
|---|---|---|---|---|
| 2010/0261423 A1* | 10/2010 | Stanforth | ............... | H04H 20/72 455/3.01 |
| 2011/0250846 A1* | 10/2011 | Shu | ...................... | H04W 72/06 455/67.7 |
| 2011/0280180 A1* | 11/2011 | McCann | ................. | H04L 63/08 370/328 |
| 2013/0267237 A1 | 10/2013 | Kim et al. | | |

FOREIGN PATENT DOCUMENTS

KR   10-2013-0099171 A    9/2013
WO   WO 2013/169011 A1    11/2013

* cited by examiner

*Primary Examiner* — Bobbak Safaipour (57) ABSTRACT

An apparatus for providing information about an available service using a proxy server and a method thereof. The apparatus includes an available service checker, a database, an available service searcher, and an available service broadcaster. The apparatus may provide information through the proxy server regarding available services of a device that is not currently connected to a basic service set (BSS), thereby preventing generation of excessive amount of traffic.

10 Claims, 4 Drawing Sheets

FIG. 4

APPARATUS FOR PROVIDING INFORMATION ABOUT AVAILABLE SERVICE USING PROXY SERVER AND METHOD THEREFOR

CROSS-REFERENCE TO RELATED APPLICATION(S)

This application claims priority from Korean Patent Application Nos. 10-2014-0007881, filed on Jan. 22, 2014, and 10-2015-0010410, filed on Jan. 22, 2015, in the Korean Intellectual Property Office, the disclosures of which are incorporated herein by references in its entirety.

BACKGROUND

1. Field

The following description relates to a system capable of providing service discovery for devices in a pre-associated state to find out services available within a wireless network, and more particularly, to an apparatus for providing information about an available service using a proxy server, which is capable of efficiently and promptly providing service information, and a method therefor.

2. Description of the Related Art

Generally, in the event a plurality of basic service sets (BSSs) exist in the same space, no methods have existed that allow each user to obtain information regarding which BSS the user should participate in so that the user can receive certain services offered within a wireless network.

Accordingly, it has been impossible to discern in advance which services are available until an association with an access point (AP) has been made. In other words, the user has had to associate with every BSS in order to check the availability of an intended service, which takes a substantial amount of time. In addition, many frames are unnecessarily transmitted, thereby causing an excessive amount of traffic.

SUMMARY

The following description relates to an apparatus for providing available service information, which provides information about an available service to devices that are not associated with a basic service set (BSS) using an access point (AP) that provides a wireless network service or a proxy server in the same network as the AP, in order to prevent the devices from individually searching for available service information, and thereby can prevent excessive amount of traffic from being generated.

In one general aspect, there is provided an apparatus for providing information about an available service using a proxy, the apparatus including: a database configured to store available service information and received information about registration of subscription; an available service checker configured to receive, from a user, available service query data that contains a service ID; compare the received query data with available service data in the database; in response to a comparison result indicating that a corresponding service is present, generate and transmit to the user available service response data that comprises information about a service corresponding to the service ID; and in response to a comparison result indicating that the corresponding service is not present, transmit the information about registration of subscription which is generated by subscribing to and registering a service corresponding to the service ID; an available service searcher configured to transmit service discovery query data associated with the subscribed service corresponding to the service ID, obtain available service data from received service discovery response data regarding a service providing device and whether or not the service providing device provides the service corresponding to the service ID of the service discovery query data, and transmit the obtained available service information; and an available service broadcaster configured to broadcast the obtained available service information to users which include at least one user that has sent the available service query data.

The available service broadcaster may be configured to periodically transmit the available service information by sending a pre-association message (PAM) that includes the available service information in order to transmit the available service information to the user that has sent the available service query data.

The available service checker may be configured to, in the absence of available service that corresponds to the available service query data, output a message to inform the user that although there are no services of interest currently available, subscription information of the services will be periodically transmitted to provide information regarding the presence of available service, and periodically provide the information about the presence of available service.

The available service broadcaster may be configured to broadcast the available service information over several frames in a distributed manner such that more users that have sent the available service information can be selected.

The available service broadcaster may be configured to, in an event of change in service information in the database, broadcast information about the event with a higher priority.

In another general aspect, there is provided a method for providing information about an available service using a proxy, the method including: storing available service information and received registrations of subscription; receiving, from a user, available service query data that contains a service ID, comparing the received data with available service data, in response to a comparison result indicating that a corresponding service is present, generating and transmitting to the user available service response data that includes information about a service corresponding to the service ID, and in response to a comparison result indicating that the corresponding service is not present, transmitting the information about registration of subscription which is generated by subscribing to and registering a service corresponding to the service ID; transmitting service discovery query data associated with the subscribed service corresponding to the service ID, obtaining available service data from received service discovery response data regarding a service providing device and whether or not the service providing device provides the service corresponding to the service ID of the service discovery query data, and transmitting the obtained available service information; and broadcasting the obtained available service information to users which include at least one user that has sent the available service query data.

The transmitting of the obtained available service information may include periodically transmitting the available service information by sending a pre-association message that includes the available service information in order to transmit the available service information to the user that has sent the available service query data.

The requesting of the registration of subscription may include, in the absence of available service, providing the information about the presence of an available service by outputting a message to inform that although there are no services of interest currently available, subscription information will be periodically transmitted to provide information about the presence of available service.

The transmitting of the obtained available service information may include broadcasting the available service information over several frames in a distributed manner such that more users that have sent the available service information can be selected.

The transmitting of the obtained available service information may include, in an event of change in service information in the database, broadcasting information about the event with a higher priority.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

Herein, an apparatus and method for providing available service information using a proxy server in accordance with exemplary embodiments of the present disclosure will be described with reference to the accompanying drawings.

Figure 1:
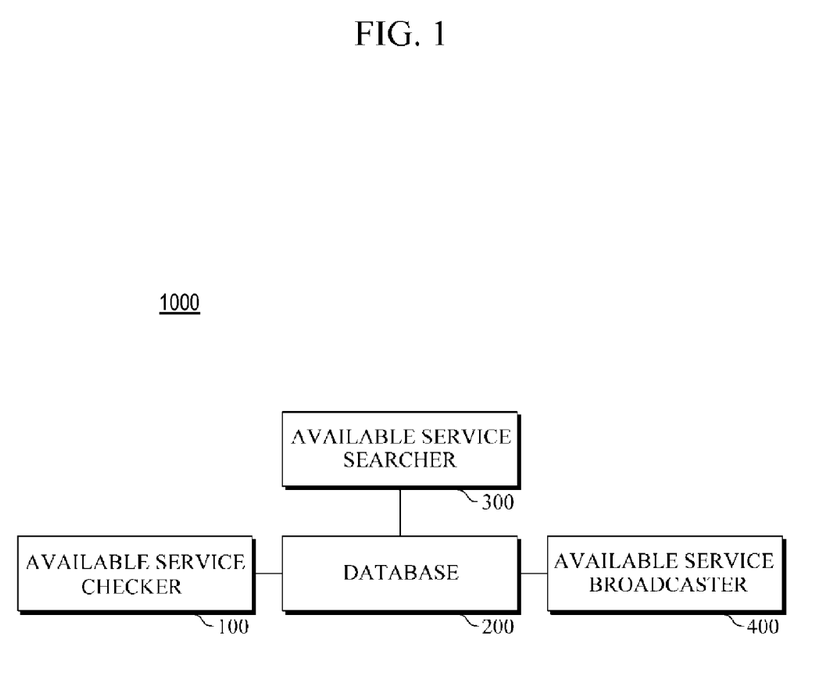
FIG. 1 is a diagram illustrating an apparatus for providing available service information using a proxy server according to an exemplary embodiment.

FIG. 1 is a diagram illustrating an apparatus for providing available service information using a proxy server according to an exemplary embodiment.

Referring to FIG. 1, the apparatus 1000 may include an available service checker 100, a database 200, an available service searcher 300, and an available-service broadcaster 400.

According to the exemplary embodiment, the apparatus 1000 may be an access point (AP), and may be implemented by using a proxy server within an AP.

An AP may refer to low-power radio equipment that functions as a base station in a wireless LAN environment. It may act as a bridge that connects a wired network to a wireless network; in a wired network environment, it may also be connected to a router or a switch, thereby increasing a network range from the wired network to a wireless network.

A proxy server may refer to a server that provides a non-associated user with information provided by a network in which an AP exists, or by an external network, such as the Internet.

In addition, the proxy is capable of understanding an individual service discovery protocol, storing the protocol in a database in appropriate format, and responding to the user's service query.

According to the exemplary embodiment, the proxy may analyze multicast DNS (mDNS) or Simple Service Discovery Protocol (SSDP) and configure service information, and an administrator of the proxy may manually configure service information and store the information in a database.

The available service checker 100 may receive available service query data that contains a service ID from a user, compare the received available service query data with available service data in the database, and, if there is a service corresponding to the received data, create available service response data that contains information about the service corresponding to the service ID, and transmit the created available service response data to the user.

According to the exemplary embodiment, if a service corresponding to the available service query data that contains the service ID is not present, the available service checker 100 may subscribe to and register a service that corresponds to the service ID contained in the available service query data, and transmit information about the registration of subscription to the database 200.

According to the exemplary embodiment, the available service query data may use a query. Here, the query may refer to making an inquiry based on a number of codes or keys to discern the content or the like of a file.

In addition, the query searches the database for data based on user's requirements, and retrieves the search result freely.

Here, the service ID refers to a designated identifier that is used to identify which services are available for use, and the service ID is not limited to any particular format.

According to the exemplary embodiment, available service response data may retrieve data from the database to identify whether a service identified by the service ID contained in the available service query data is in an available state.

In addition, available service response data that includes the reference results is generated and transmitted to the user as a response to the inquiry.

In response to receiving available service query data that contains a service ID, the available service checker 100 generates available service response data regarding the availability of a service corresponding to the service ID and transmits it to the user terminal 10.

In this case, if retrieval fails to show any service corresponding to the service ID is unavailable to be provided, the user is given the response data, notifying that relevant information is currently unavailable in the database. In addition, service information with respect to this service may be broadcast in the future.

According to the exemplary embodiment, although the database currently does not include information about the service of interest, it is possible to provide the relevant service information by obtaining it from a server connected to the available service searcher using a service discovery protocol.

In addition, through the service discovery query data, the proxy is able to announce, in a broadcast manner, whether the service of interest is available or not, and an interval and duration of the announcement may be determined by various methods.

According to the exemplary embodiment, registration of subscription may refer to storing the service ID, which is contained in the available service response data, in the database.

In addition, information about the availability of a subscribed service may regularly be updated and transmitted.

According to the exemplary embodiments, in the case where a service that corresponds to the available service query data does not exist, a message may be transmitted to inform to the user that although there are no services of interest currently available, subscription information of the services will be periodically transmitted to provide information regarding the presence of available services.

In addition, information about the presence of available services may be periodically provided to the corresponding user.

The database 200 may store the available service information and received information about the registration of subscription.

According to the exemplary embodiment, the available service information may refer to information about a service that can be currently offered by a device within a basic service set (BSS), and may contain a name, type, details, and the like of available service to be offered.

In addition, in a case where a network within which the BSS is located is connected to an external network and capable of providing a service that is based on the external network, service information related to the service may be stored in the database and be used for service query or broadcasting.

The available service searcher 300 may transmit service discovery query data that contains a service ID of a subscribed service.

According to the exemplary embodiment, transmission of service discovery query data to a user may refer to providing the user that is non-connected to the BSS with information about the availability of the service even before association with the BSS.

In addition, if there are no queries, the service provider may arbitrarily request the provision of service information or obtain service information using a method that utilizes multicast packets within a network.

The case where the service information is obtained through multicast packets includes mDNS and SSDP.

In addition, the service searcher 300 may receive service discovery response data that contains information about whether a service corresponding to the service ID contained in the transmitted service discovery query data is provided as well as information about a service providing device.

Then, by using the received service discovery response data, the service searcher 300 may obtain information about a service that can be provided by a device within the BSS, and store the obtained information in the database 200.

According to the exemplary embodiment, the service discovery query data may be generated by a query, as is the available service query data. The available service response data is generated to correspond one-to-one with the service discovery query data, and is then transmitted to the database 200 and the available service broadcaster 400.

The available service broadcaster 400 may broadcast the obtained available service information to users, at least one of which has sent the available service query data.

According to the exemplary embodiment, in order to broadcast available service information to subscribed users that have sent available service query data, the available service broadcaster 400 may periodically transmit the available service information by sending a pre-association message (PAM) that includes the information.

According to the exemplary embodiment, information may be regularly transmitted by the help of a PAM format, but aspects of the present disclosure are not limited thereto, such that the transmission may take place only once or a predetermined number of times.

The PAM refers to a message that contains information that can be received by a particular device from a desired sender device that is associated with the particular device over a wireless network, such as a wireless LAN, even before establishment of a direct association between the two devices.

According to the exemplary embodiment, a format of the PAM may be a Service Information element defined by IEEE 802.11aq.

In this case, the PAM may be included in a Beacon frame, a Probe Response frame, or a General Advertisement Service (GAS) frame and then transmitted.

In addition, information on the service available for being broadcast is selected in order to provide network efficiency. The proxy may not only substitute for a query, but also adjust the targets and intervals of the service to be broadcast.

In this case, the number of services to be broadcast may be limited, in order to prevent excessive load on the wireless network, by first transmitting the service searched in the latest query or the service most frequent inquired about, or the service requested by the administrator.

According to the exemplary embodiment, the available service information may be broadcast over several frames in a distributed manner such that more users that have sent available service information can be selected.

In addition, in the event of change in service information in the database of the proxy, such an event is given priority for broadcasting, whereby information about the change is provided to the wireless network.

Here, the change in service information may be caused by information obtained through a service discovery protocol within the network or by policy changes set by the administrator.

Figure 2:
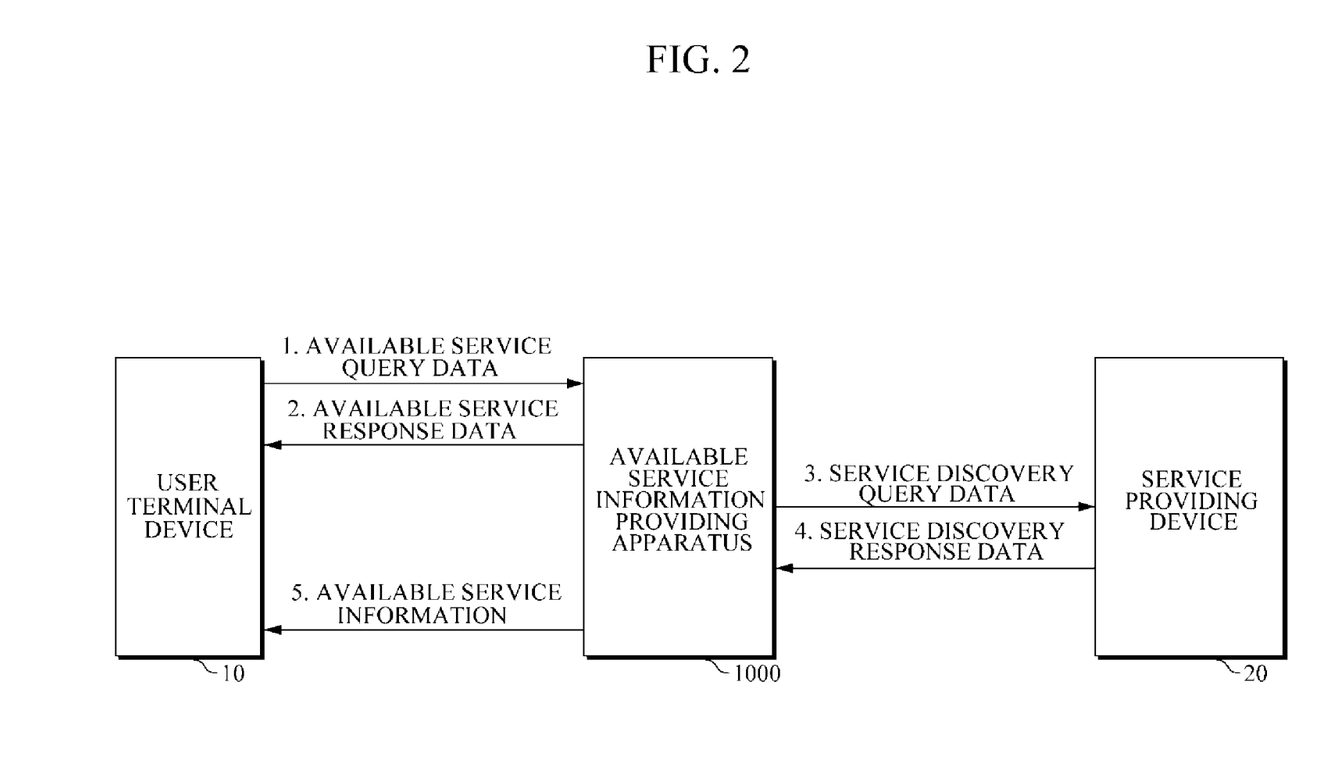
FIG. 2 is a diagram illustrating a data flow among an apparatus for providing available service information, a user terminal, and a service providing device.

FIG. 2 is a diagram illustrating a data flow among an apparatus for providing available service information, a user terminal, and a service providing device.

Referring to FIG. 2, available service information is provided to the user terminal device 10 by transmission and reception of each data between the apparatus 1000 for providing available service information, the user terminal device 10, and the service providing device 20.

The user may transmit available service query data to the apparatus 1000 through the user terminal device 10 to check the availability of a service of interest.

The apparatus 1000 may receive the available service query data and search the database 200 to identify the presence of information about a service corresponding to the received service query data, generate available service response data that contains information regarding whether the corresponding service is in use or not, and transmit the generated available service response data to the user terminal device 10.

According to the exemplary embodiment, the user that has sent the available service query data is compared with a service ID that is contained in the available service query data. When a corresponding service has been found, the apparatus may transmit subscription information that has been produced when a service corresponding to the service ID is subscribed to and registered.

In addition, in a case where a service that corresponds to a service ID in the available service query data is not present in the database 200, the apparatus 1000 may transmit the service discovery query data along with the service ID corresponding to the subscribed service. The apparatus 1000 may receive the service discovery response data and obtain and transmit available service information using the received service discovery response data, wherein the service discovery response data includes both information regarding whether the service providing device 20 provides a particular service corresponding to the service discovery query data and information about the service providing device.

At this time, the obtained available service information may be stored in the database 200.

According to the exemplary embodiment, available service information about the service subscribed to by users may be broadcast to the users which include at least one user that has sent the available service query data.

Figure 3:
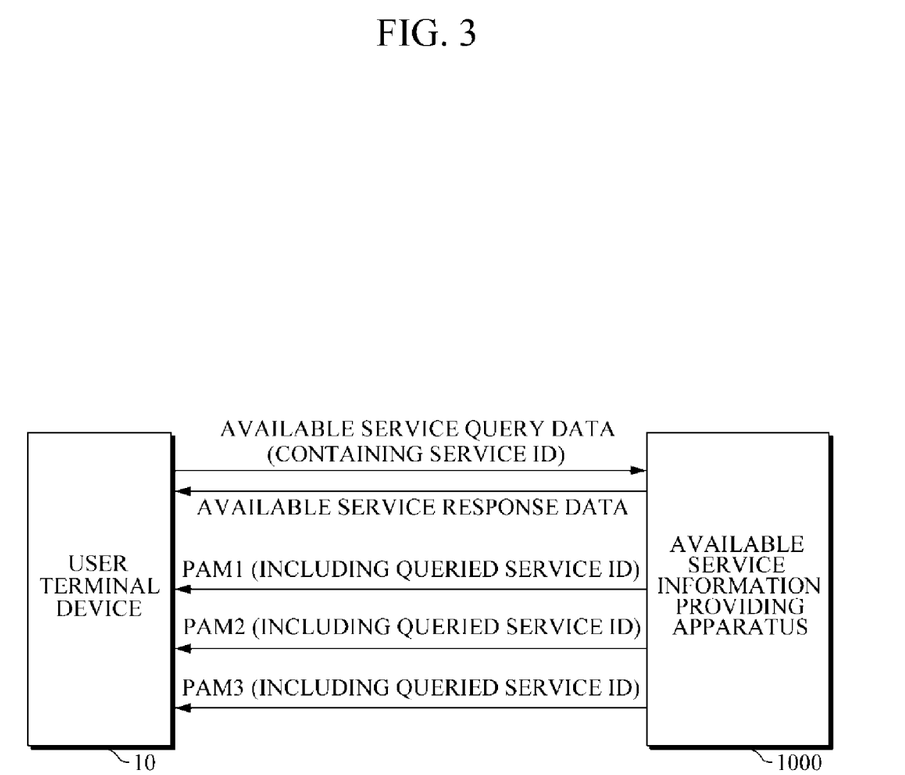
FIG. 3 is a diagram illustrating a data flow between an apparatus for providing available service information and a user terminal device according to an exemplary embodiment in which a pre-association message (PAM) is used.

FIG. 3 is a diagram illustrating a data flow between an apparatus 1000 for providing available service information and a user terminal device 10 according to an exemplary embodiment in which a PAM is used.

Referring to FIG. 3, the apparatus 1000 for providing available service information may use a PAM to broadcast service information data to a user's service terminal device 10.

In response to receiving available service query data that includes a service ID from the user terminal device 10, the apparatus 1000 transmits, to the user terminal device 10, available service response data that contains information about the availability of a service corresponding to the available service query data. At this time, if the service corresponding to the service ID is not found in a database, and is thereby determined as being unavailable, the service that corresponds to the user ID may be registered for subscription.

In the example, a PAM may be created to include information about an available service obtained from the service discovery response data that has been transmitted from a service providing device 20.

Further, the created PAM may be broadcast to a plurality of user terminal devices associated with the corresponding service and which are possessed by at least one subscribed user.

Figure 4:
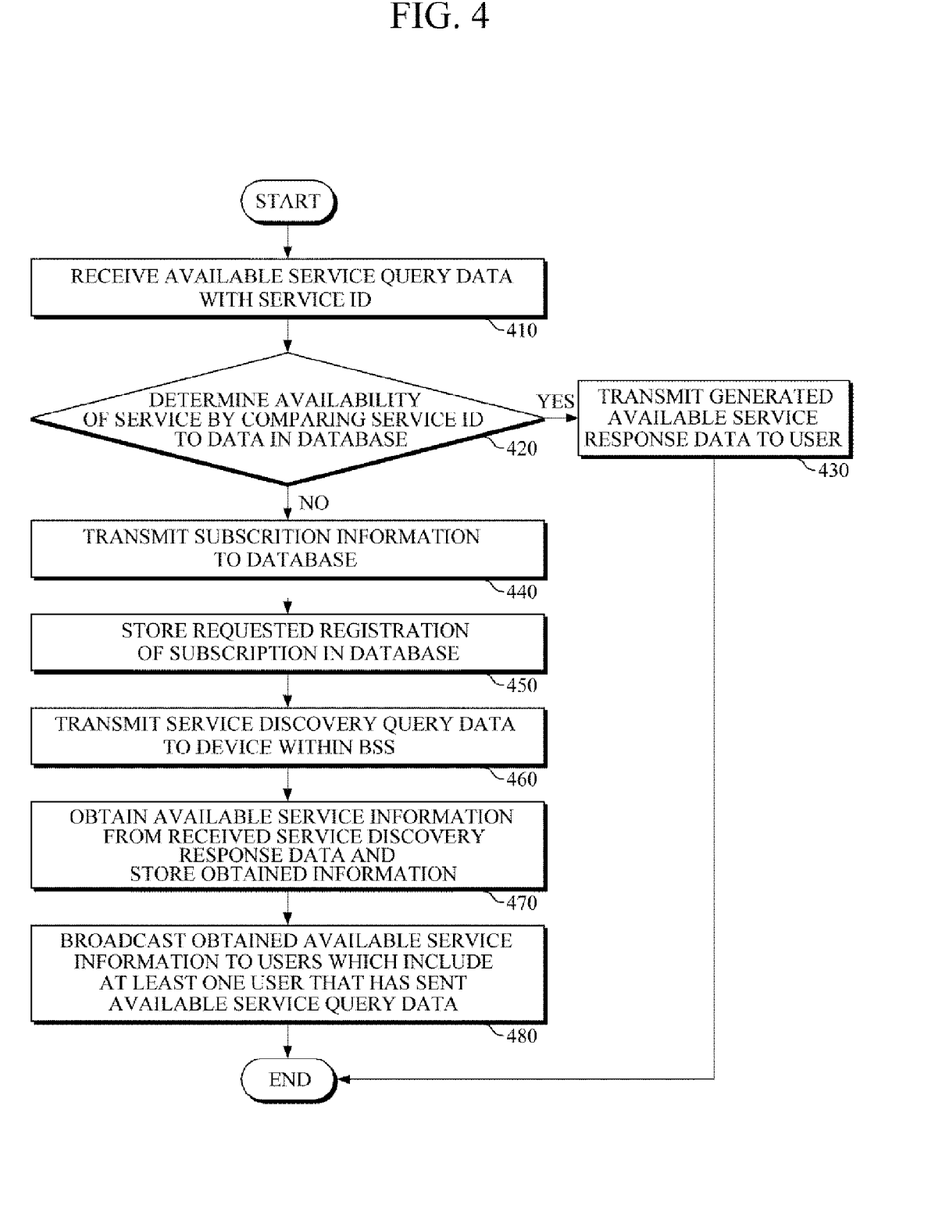
FIG. 4 is a flowchart illustrating a method for providing information about available services according to an exemplary embodiment.

FIG. 4 is a flowchart illustrating a method for providing information about available services according to an exemplary embodiment.

In 410, an available service query data that contains a service ID is received from a user.

According to the exemplary embodiment, the available service query data may use a query. Here, the query may refer to making an inquiry based on a number of codes or keys to discern the content or the like of a file, searching a database for intended data based on user's requirements, and freely retrieving the search result.

The service ID refers to a designated identifier that is used to identify which services are available for use, and the service ID is not limited to any particular format.

Service availability is determined by comparing the service ID to data in the database in 420.

According to the exemplary embodiment, the service response data may retrieve data from the current database to identify whether the service that is identified by the service ID within the available service query data is in an available state.

According to the exemplary embodiment, the available service response data may retrieve data from the current database to check whether or not the service identified by the service ID within the available service query data is available to be provided. If there is a corresponding service in the database, the service is determined as being available, and otherwise, the service is determined as being unavailable.

Data that includes the retrieval result may be generated as a response to the query and transmitted to the corresponding user.

When a service is determined as being available, available service response data is generated and transmitted to the user in 430.

In this case, if retrieval fails to show any service corresponding to the service ID is unavailable to be provided, the user is given the response data, notifying that no relevant information is currently present in the database. In addition, service information with respect to this service may be broadcast in the future.

According to the exemplary embodiment, the service discovery query data may generate a query, and available service response data may be generated to correspond one-to-one with the service discovery query data, and stored in the database.

According to an exemplary embodiment, in the case where an available service that corresponds to the available service query data does not exist, a message may be transmitted to inform to the user that although there are no services of interest currently available, subscription information of the services will be periodically transmitted to provide information regarding the presence of available services.

Then, the information about the presence of available service may be periodically provided to the pertaining user, and aspects of the present disclosure are not limited thereto, such that the transmission may take place only once or a predetermined number of times.

Along with the message described above, the consent of the user to periodically receive the subscription information is obtained. Only with the user's consent, is the information about the presence of available services provided by regularly sending subscription information.

If a service that has been inquired of is determined as being unavailable, the service is subscribed to and registered, in which subscription information thereof is generated and transmitted to the database in 440.

According to the exemplary embodiment, a subscription to a service may refer to a request for subscription to a service that corresponds to a service ID from the available service query data and registration of the service that corresponds to the service ID from the available service query data.

Furthermore, the information about the availability of a subscribed and registered service is regularly updated so that the subscribed service can be transmitted later to the registered user based on the updated information.

The information received about registration of subscription is stored in the database in 450.

According to the exemplary embodiment, the database may store available service information and the information it receives about registration of subscription.

According to the exemplary embodiment, the available service information may refer to information about a service that can currently be provided from a device within the BSS, and may include a service name, a service type, details of the service to be provided, and the like.

In addition, when a network, in which the relevant BSS is located, is connected to an external network and is capable of providing a service that is based in the external network, service information related to the service may be stored in the database and be used for service query or broadcasting.

The available service information may include a name, type, details, and the like of available service to be offered.

The service discovery query data that includes the service ID is transmitted to the device within the BSS in 460.

According to the exemplary embodiment, service discovery query data that contains a service ID corresponding to the subscribed service may be transmitted to a device within the BSS.

The service discovery response data about a service corresponding to the service ID is received, and the available service information is obtained from the service discovery response data and then stored in the database in 470.

According to an exemplary embodiment, it may be possible to receive the service discovery response data, which contains information regarding whether or not the service providing device provides the service corresponding to the transmitted service ID and information about the service providing device.

In addition, available service information may be obtained from the service discovery response data and then stored in the database.

The obtained available service information is broadcast to users which include at least one user that has sent the available service query data in 480.

According to the exemplary embodiment, available service information obtained with respect to the subscribed service may be broadcast to users which include at least one user that has sent the available service query data.

In addition, relevant service information may be periodically broadcast vis PAM to users that have subscribed to a service and have thus transmitted available service query data.

The PAM refers to a message that contains information that can be received by a particular device from a desired sender device that is associated with the particular device over a wireless network, such as a wireless LAN, even before establishment of a direct association between the two devices.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for providing information about an available service using a proxy, the apparatus comprising:
    a base station for a wireless network or a proxy server in a local area network, the base station or proxy server including:
    a database configured to store available service information and received information about registration of subscription;
    an available service checker configured to receive, from a user, available service query data that contains a service ID; compare the received data with available service data; in response to a comparison result indicating that a corresponding service is present, generate and transmit to the user available service response data that comprises information about a service corresponding to the service ID; and in response to a comparison result indicating that the corresponding service is not present, transmit the information about registration of subscription which is generated by subscribing to and registering a service corresponding to the service ID;
    an available service searcher configured to transmit service discovery query data associated with the subscribed service corresponding to the service ID, obtain available service data from received service discovery response data regarding a service providing device and whether or not the service providing device provides the service corresponding to the service ID of the service discovery query data, and transmit the obtained available service information; and
    an available service broadcaster configured to broadcast the obtained available service information to users which include at least one user that has sent the available service query data.

2. The apparatus of claim 1, wherein the available service broadcaster is configured to periodically transmit the available service information by sending a pre-association message (PAM) that includes the available service information in order to transmit the available service information to the user that has sent the available service query data.

3. The apparatus of claim 1, wherein the available service checker is configured to, in the absence of available service that corresponds to the available service query data, output a message to inform the user that although there are no services of interest currently available, subscription information of the services will be periodically transmitted to provide information regarding the presence of available service, and periodically provide the information about the presence of available service.

4. The apparatus of claim 1, wherein the available service broadcaster is configured to broadcast the available service information over several frames in a distributed manner such that more users that have sent the available service information can be selected.

5. The apparatus of claim 1, wherein the available service broadcaster is configured to, in an event of change in service information in the database, broadcast information about the event with a higher priority.

6. A method for providing information about an available service using a proxy, the method comprising:
    storing available service information and received registrations of subscription;
    receiving, from a user, available service query data that contains a service ID, comparing the received data with available service data, in response to a comparison result indicating that a corresponding service is present, generating and transmitting to the user available service response data that comprises information about a service corresponding to the service ID, and in response to a comparison result indicating that the corresponding service is not present, transmitting the information about registration of subscription which is generated by subscribing to and registering a service corresponding to the service ID;
    transmitting service discovery query data associated with the subscribed service corresponding to the service ID, obtaining available service data from received service discovery response data regarding a service providing device and whether or not the service providing device provides the service corresponding to the service ID of the service discovery query data, and transmitting the obtained available service information; and broadcasting the obtained available service information to users which include at least one user that has sent the available service query data.

7. The method of claim 6, wherein the transmitting of the obtained available service information comprises periodically transmitting the available service information by sending a pre-association message that includes the available service information in order to transmit the available service information to the user that has sent the available service query data.

8. The method of claim 6, wherein the requesting of the registration of subscription comprises, in the absence of available service, providing the information about the presence of an available service by outputting a message to inform that although there are no services of interest currently available, subscription information will be periodically transmitted to provide information about the presence of available service.

9. The method of claim 6, wherein the transmitting of the obtained available service information comprises broadcasting the available service information over several frames in a distributed manner such that more users that have sent the available service information can be selected.

10. The method of claim 6, wherein the transmitting of the obtained available service information comprises, in an event of change in service information in the database, broadcasting information about the event with a higher priority.

* * * * *